__United States Patent__ [19]

Blankenburg et al.

[11] Patent Number: 4,906,508

[45] Date of Patent: Mar. 6, 1990

[54] MOLDED STRUCTURAL MODULE AND PROCESS FOR MAKING THE SAME

[76] Inventors: Karl Blankenburg; Karl V. Blankenburg, both of 42050 Executive Dr., Mt. Clemens, Mich. 48045-3488

[21] Appl. No.: 250,074

[22] Filed: Sep. 28, 1988

[51] Int. Cl.⁴ .............................................. B32B 3/12
[52] U.S. Cl. ...................................... 428/116; 428/118
[58] Field of Search ................. 428/73, 116, 117, 118

[56] References Cited

U.S. PATENT DOCUMENTS

| | | | |
|---|---|---|---|
| 2,644,777 | 7/1953 | Havens | 428/116 |
| 2,831,688 | 4/1958 | Knox | 428/119 X |
| 2,992,151 | 1/1961 | Niessen | 428/133 |
| 3,366,530 | 1/1968 | Kodich | 428/116 |
| 3,432,859 | 3/1969 | Jordan et al. | 428/116 X |
| 3,461,632 | 8/1969 | Kuhne | 428/116 X |
| 3,525,663 | 9/1970 | Hale | 428/179 |
| 3,616,025 | 7/1971 | Fairbanks | 156/257 |
| 3,617,416 | 3/1971 | Kromrey | 428/117 X |
| 3,673,057 | 6/1972 | Fairbanks | 428/116 |
| 3,775,234 | 2/1973 | Rich | 428/183 |
| 3,876,492 | 5/1975 | Schott | 428/178 X |
| 3,983,283 | 9/1976 | Bagley | 428/116 |
| 4,049,855 | 6/1977 | Cogan | 428/116 |
| 4,136,846 | 1/1979 | Brault | 428/116 X |
| 4,374,440 | 2/1983 | Drapkin | 428/116 X |

Primary Examiner—Henry F. Epstein
Attorney, Agent, or Firm—Barnes, Kisselle, Raisch, Choate, Whittemore & Hulbert

[57] ABSTRACT

Structural modules for incorporation in vehicle bodies, multiple part assemblies and other structures, utilizing a mixture of art based or simple geometric shapes increasing or decreasing, interrupted or uninterrupted in progression including honeycomb cells on parallel axes that can be bound together on an encompassing skin. These structures can be formed cast, sandwiched, or molded of plastic. The modules are shaped to fit various assembly areas and volumes especially those with curved or irregular contours.

3 Claims, 7 Drawing Sheets

FIG.2
FIG.3
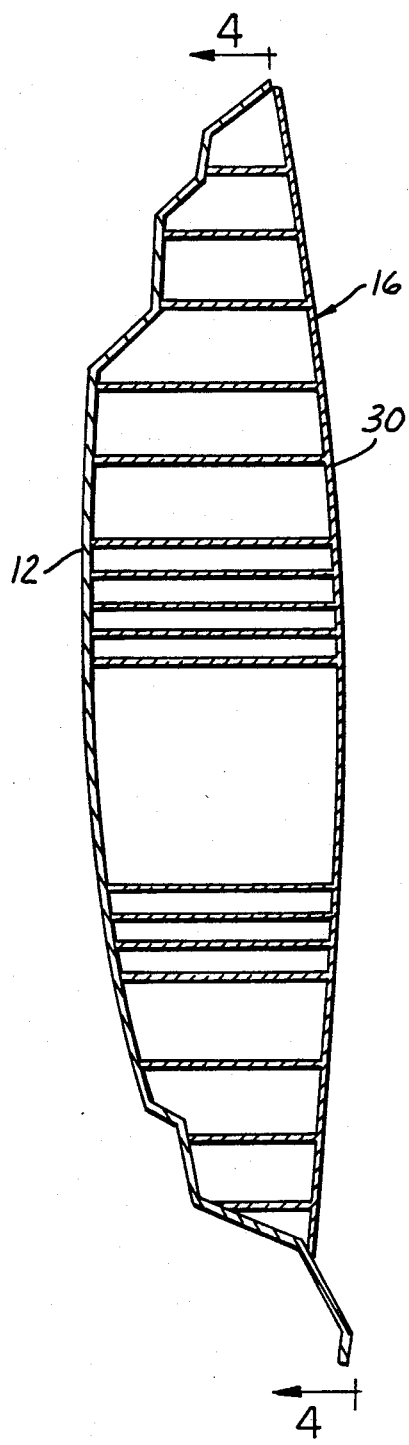
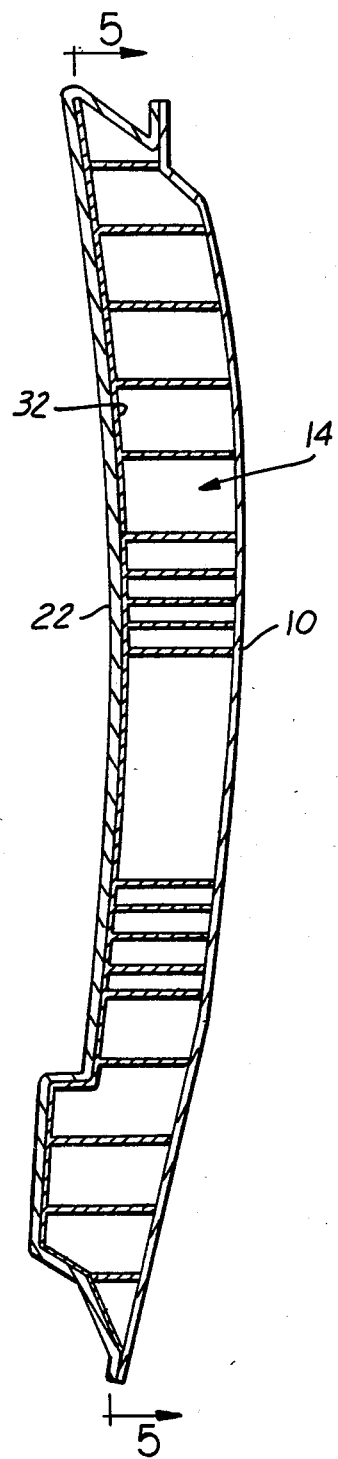

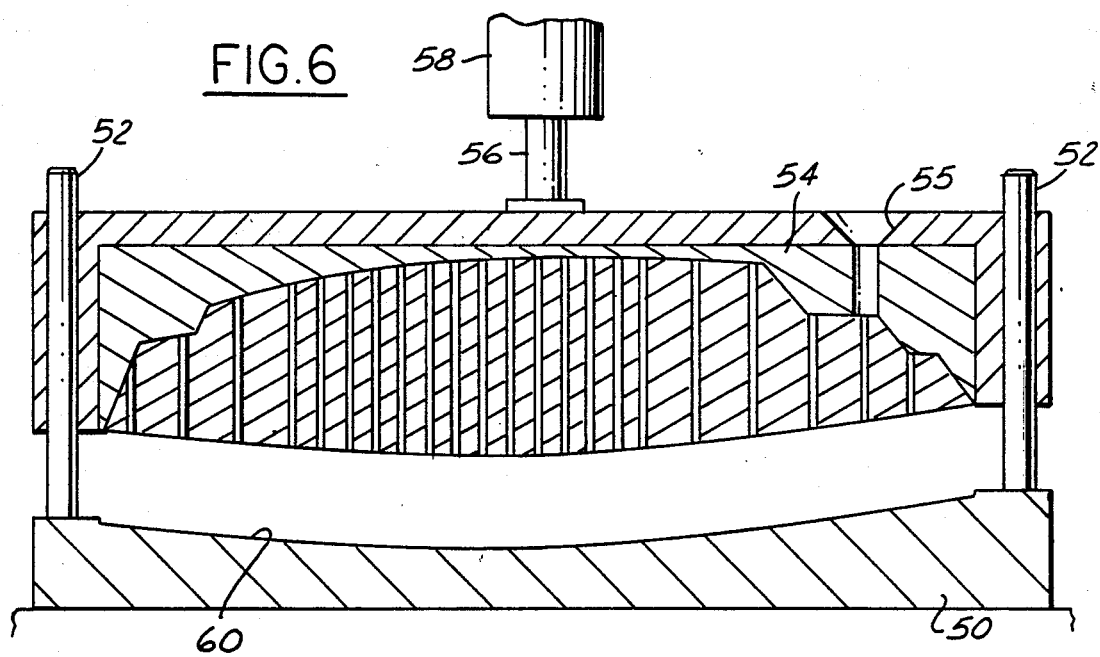
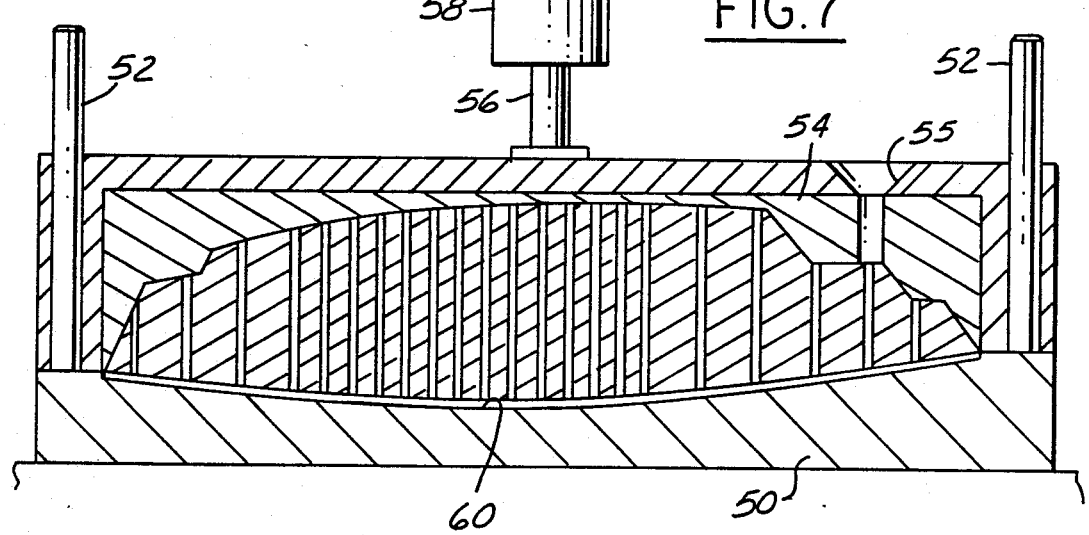

MOLDED STRUCTURAL MODULE AND PROCESS FOR MAKING THE SAME

FIELD OF THE INVENTION

Structural elements utilizing a mixture of geometric shapes including honeycomb reinforcement unified by an encompassing skin layer integrally formed with or bound to such shapes.

BACKGROUND AND FEATURES OF THE INVENTION

It is common to use honeycomb reinforcement for various structural elements such as airplane wings and fuselage elements. This type of reinforcement provides strength in conjunction with weight reduction which are important features in airplane construction. In addition, in present day vehicle construction, impact strength has become a significant factor as well as weight reduction and cost factors.

It is an object of the present invention to provide a structural module which is strong and light and which can be produced at a significant cost reduction in comparison to metallic welded assemblies.

It is a further object to provide a process for manufacturing structural modules in an economically feasible manner for high production items.

Other objects and features involve the use of various geometric structures which can be made by any of the common molding processes such as vacuum forming, pressure forming, stamping injection molding, compression molding, blow molding, fiber glass hand lay up and so forth. The parts are preferably designed with draft angles where necessary in the molding process selected and can be designed for planar layout or stacking to build in impact strength and shear strength. The designs lend themselves to contour designs to conform to the requirements of the final product such as vehicle doors, truck decks, vehicle hoods, and other body parts. One or both sides of a structure can be contoured.

By filling the hollow geometric shapes with a light foam, added strength can be achieved as well as sound proofing.

Other objects and features of the invention will be apparent in the following description and claims in which the principles of the invention are set forth together with details to enable persons skilled in the art to practice the invention all in connection with the best mode presently contemplated for the invention.

BRIEF DESCRIPTION OF THE DRAWINGS

DRAWINGS accompany the disclosure and the various views thereof may be briefly described as:

FIG. 2, a sectional view of a formed module;

FIG. 3, a sectional view of a formed module;

FIG. 6, a sectional view of a forming die for a module in open position;

FIG. 7, a view similar to FIG. 6 with the die in closed position;

DETAILED DESCRIPTION OF THE INVENTION AND THE MANNER AND PROCESS OF USING IT

Various examples of geometric cell shapes will be described including honeycomb design, truncated square, triangular and hexagonal pyramids, diamond shapes, hexagonal shapes. It is contemplated that a variety of hollow geometric shapes having three dimensions can be used. These shapes can be arranged in various arrays, such as square, circumferentially around a center, triangular, circular, or in alignment. In each instance, the dimension of the various cells can be varied so that a more dense area may be filled with smaller cells to increase the strength of the particular area. Thus, the size, the spacing, the height of the cells, as well as the thickness of the walls, can be varied to adapt to the strength needed. The first shapes to be described are panels utilizing honeycomb reinforcement.

Figure 1:
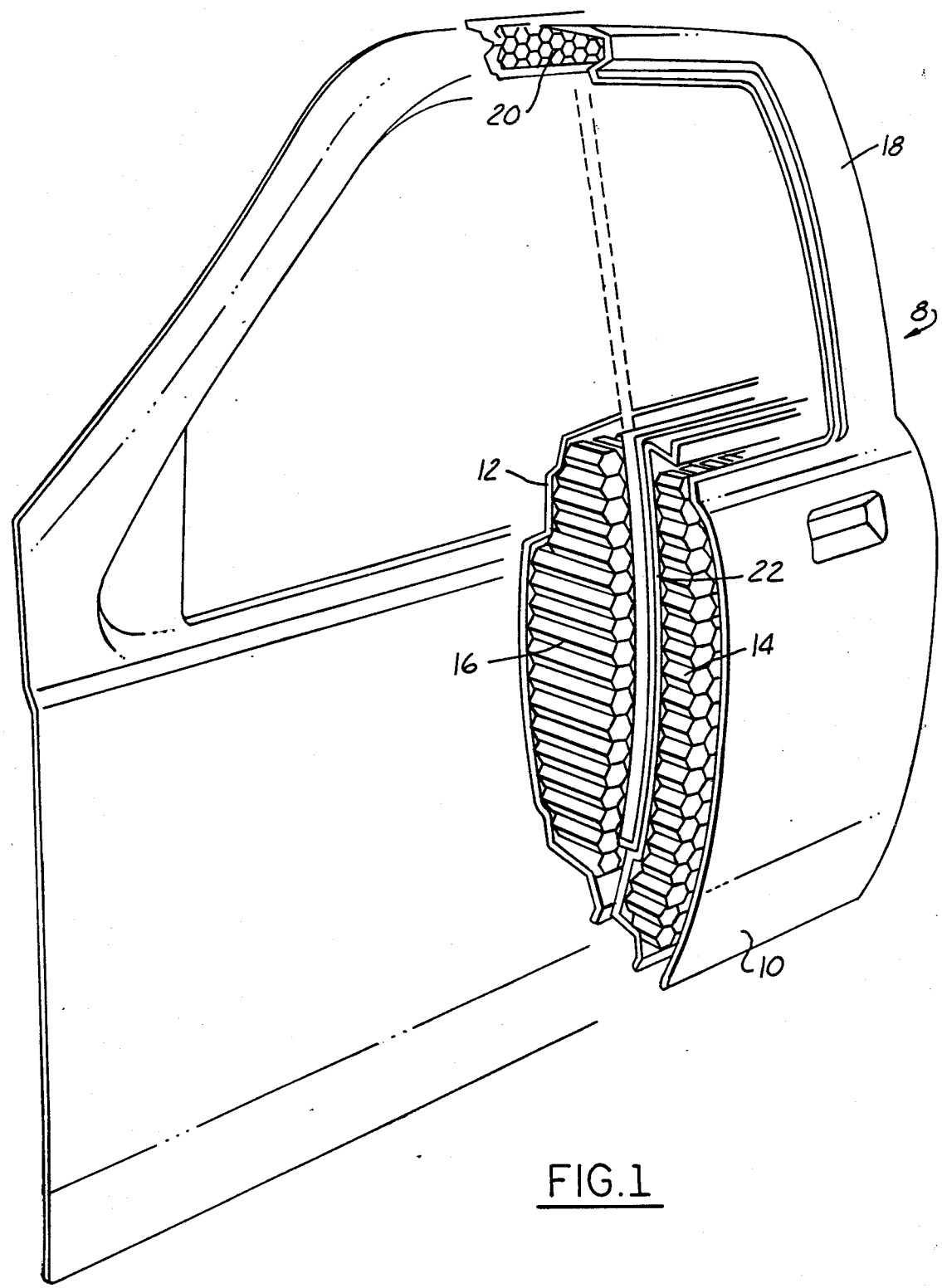
FIG. 1, a view, partially in section, showing a completed vehicle door which includes preformed modules.

With reference to FIG. 1, a vehicle door panel 8 is shown having an outside metal or fiberglass skin 10 which is the decorative surface to be painted with the appropriate finish and color. On the inside of the panel is the decorative interior facing 12 which will be leather or a fabric or plastic covering with the color appropriate to the particular vehicle decor. Within the outer skin 10 is an outer structure 14 of molded plastic with a honeycomb design. Outside the inner decorative facing 12 is an inner molded plastic structure 16.

The door panel 8 has a window frame structure 18 which contains a molded filler structure 20. Between the molded structures 14 and 16 is a window receptacle 22 providing a window slot for a window panel. The usual hardware and operating mechanism will be provided as needed in the modules 14 and 16.

Figure 4:
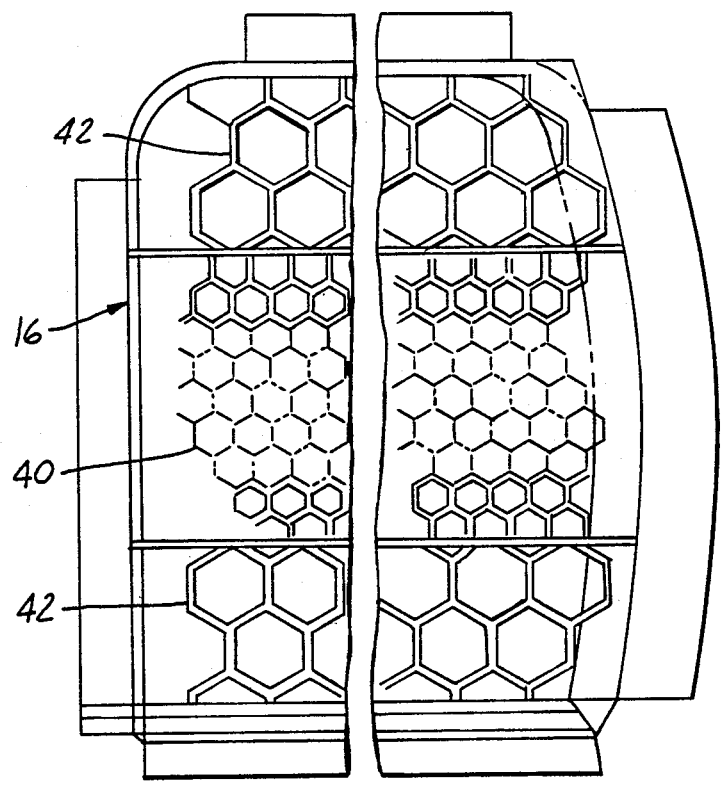
FIG. 4, an elevational view on line 4—4 of FIG. 2.
Figure 5:
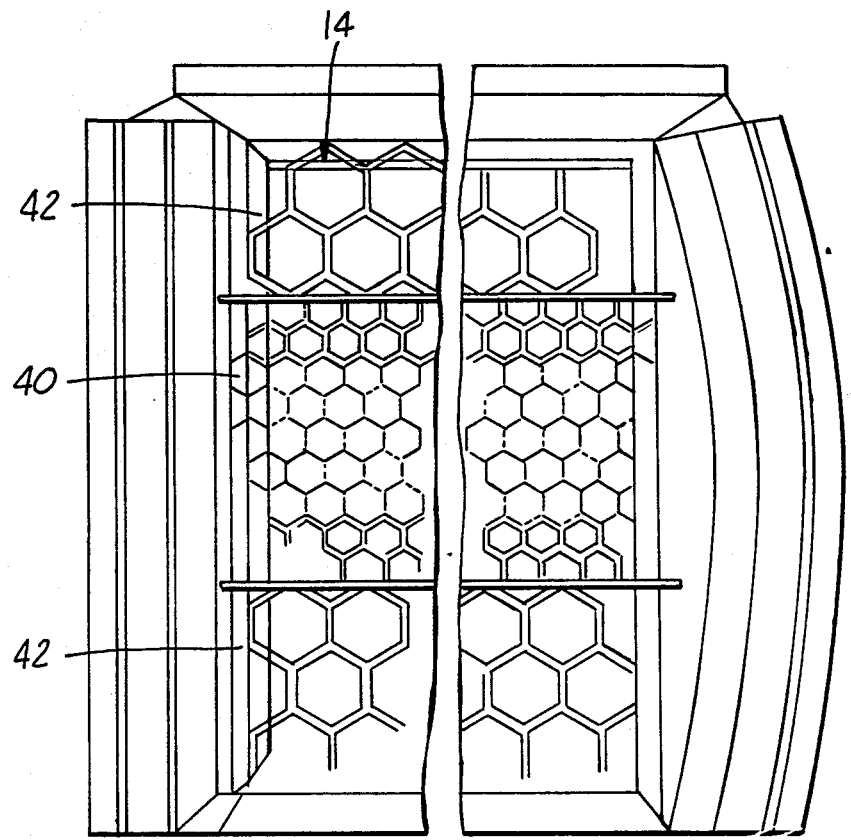
FIG. 5, an elevational view on line 5—5 of FIG. 3.

In FIGS. 2 and 3 are sectional views of the modules 14 and 16 which are viewed in elevation in FIGS. 4 and 5.

In FIG. 2, the inner finish panel is shown at 12 but the module 16 has a skin surface 30 which is integrally molded with the honeycomb filler material of the module. Similarly, in FIG. 3, the outer finish panel 10 and the inner finish panel forming the window slot 22 are shown but within the panel 22 is a skin panel 32 initially molded with the honeycomb filler. These skin coverings 30 and 32 may be on one side or the other of the module and in some instances may comprise a finish panel.

In FIGS. 4 and 5, the elevational views illustrate how the modules can be formed with selected dimensions of the honeycomb depending on where the strength is to be needed. The smaller size dimension at 40 are located centrally in this instance to provide greater strength in the midsection of the panel while the larger dimensions 42 are located at the borders. It will be appreciated that other cross-sectional configurations than the honeycomb may be utilized such as round, square, octagonal shapes.

FIGS. 6 and 7 illustrate diagrammatically a molding press for shaping the structural modules. A press bed 50 is slidably oriented by pins 52 with an upper forming die 54 having one or more suitably disposed sprues 55. The upper die is actuated by a piston rod 56 powered in a cylinder 58.

The upper die has recesses and interconnecting walls similar in cross-section to those shown as examples in FIGS. 4 and 5. The bottom end of the recesses in the die will be closed to leave open the interconnected wall openings to form the honeycomb walls. The lower die has a shallow recess or cavity 60 which provides the clearance space for the skin which will be molded with the module and interconnect the open cells of the modules on one side of the completed structure.

Thus, the intercell module can be adapted to various curved and irregular shapes and form strong, lightweight structures which are easily assembled into the completed structure. Many different plastics may be used in the molding of the modules. Preferably, a high impact resistant plastic is desirable with good pre-mold flow characteristics. Thermosetting or pressure setting plastic can be utilized and any of the many molding processes can be used to form the core items.

In FIGS. 8 to 19, modified core and structural units are illustrated. As in the previously described structures, these may be used for planar or curved structures with connecting skin panels.

Figure 8:
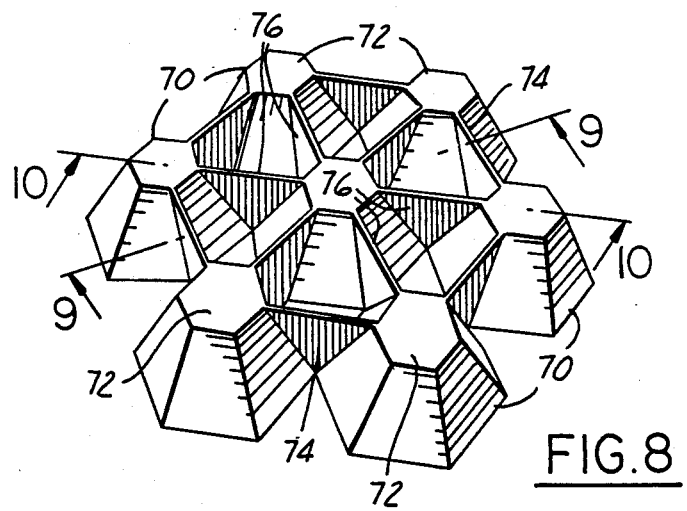
FIG. 8, a view of a composite geometric shape for incorporation in a structural unit.
Figure 9:
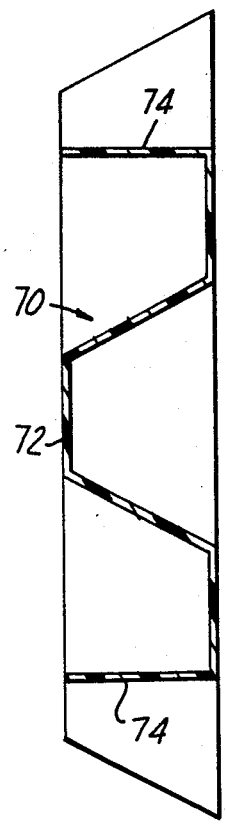
FIG. 9, a sectional view on line 9—9 of FIG. 8.
Figure 10:
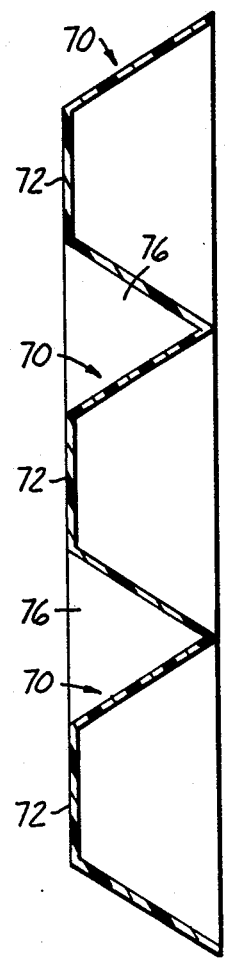
FIG. 10, a sectional view on line 10—10 of FIG. 8.

FIG. 8 shows a cluster of seven hexagonal based pyramids 70 truncated to provide flat tops 72 and connected by circumferential webs 74 as well as radial webs 76. FIGS. 9 and 10 are sectional views on lines 9—9 and 10—10 of FIG. 8. The webs and walls of the composite structure can be designed and formed with suitable draft angles for conventional molding techniques.

Figure 11:
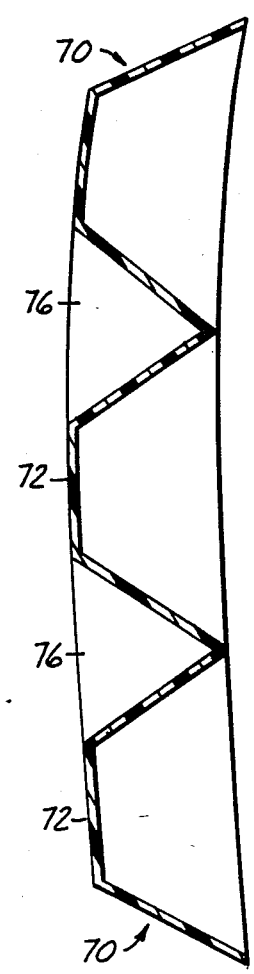
FIG. 11, a view similar to FIG. 10 showing a contoured unit.

FIG. 11 shows a section of a cluster as illustrated in FIG. 8 with a curved configuration to adapt to a particular structural part such as a vehicle panel.

Figure 12:
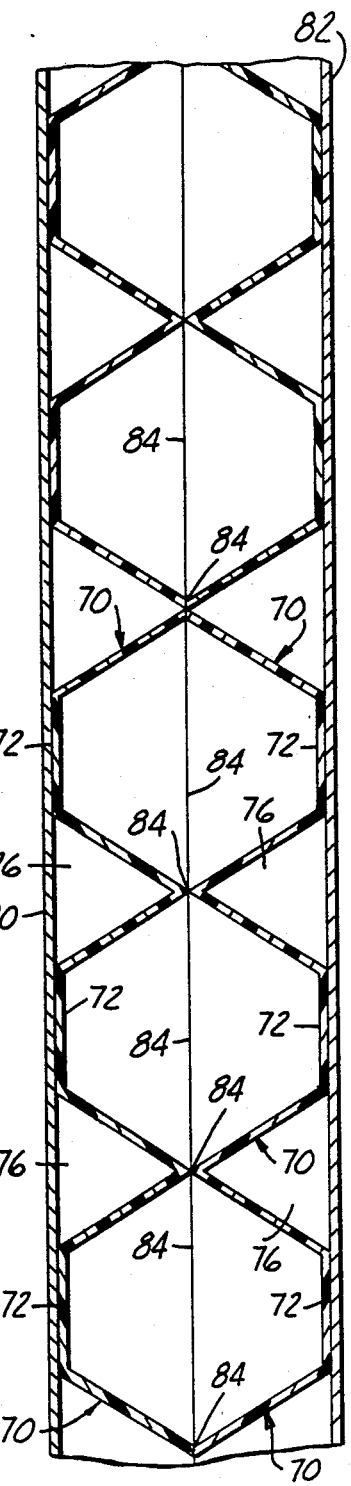
FIG. 12, a composite body with sandwiched structural units incorporated with opposed skin panels.

In FIG. 12, a double wall structure is illustrated with opposed skin panels 80 and 82 incorporating cluster units similar to that shown in FIG. 8. The flat tops 72 are sonic welded to the skin panels or otherwise adhered by available adhesives. The edges of the pyramid walls and the webs are joined at 84 by similar permanent securing procedures. Thus, an extremely strong and light panel is provided which has impact strength as well as shear resistance. It is to be noted that the composite structure has not only triangular recesses but also hexagonal recesses which are inherently strong.

Figure 13:
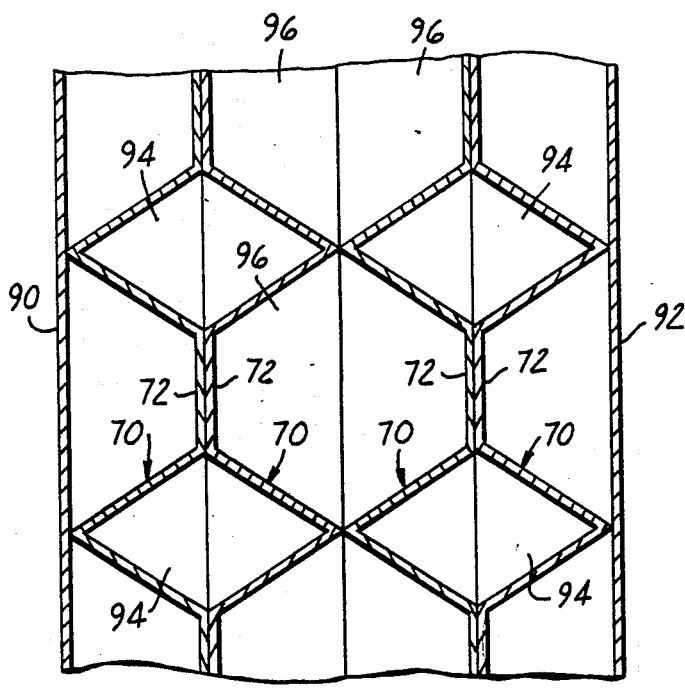
FIG. 13, a composite body with four structural units joined base to base and apex to apex.

FIG. 13 illustrates a four-stack structure with spaced skin panels 90 and 92. This combination results in diamond shape recesses 94 but also in the hexagonal recesses 96. All of the walls of these cells within the structure reinforce each other to provide a very strong composite panel.

Figure 14:
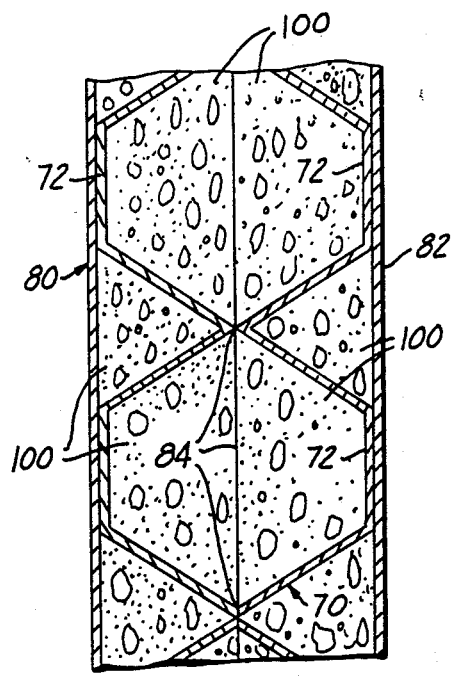
FIG. 14, a composite body with truncated pyramids between reinforcement skins.

In FIG. 14, there is illustrated a double-stack combination as viewed in FIG. 12 but the cavities, triangular, pyramidal, and hexagonal are filled with a foam material 100 which is very light and yet adds strength to the walls of the interior cells and provides sound deadening characteristics.

Figure 15:
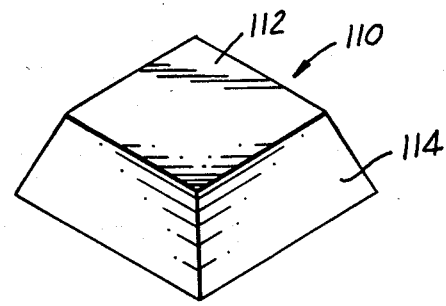
FIG. 15, a modified geometric shape as a base for a composite structure.
Figure 16:
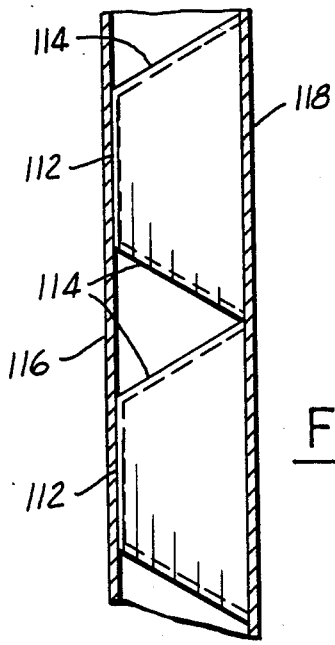
FIG. 16, a composite structure utilizing the shape of FIG. 15 between skin panels.

In FIG. 15 a modified geometrical shape is illustrated in the form of a hollow, four-sided, truncated pyramid 110 with a flat top 112 and sides 114. This shape 110 is incorporated in a combination structure illustrated in FIG. 16 with spaced skins 116 and 118 welded to the tops 112 and to the edges of the sides 114.

Figure 17:
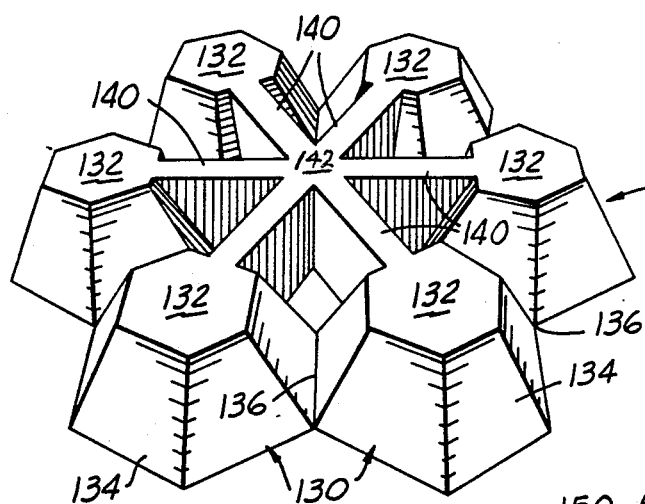
FIG. 17, a perspective view of a core design for use in a composite structure utilizing hexagonal truncated pyramid units radially connected.
Figure 18:
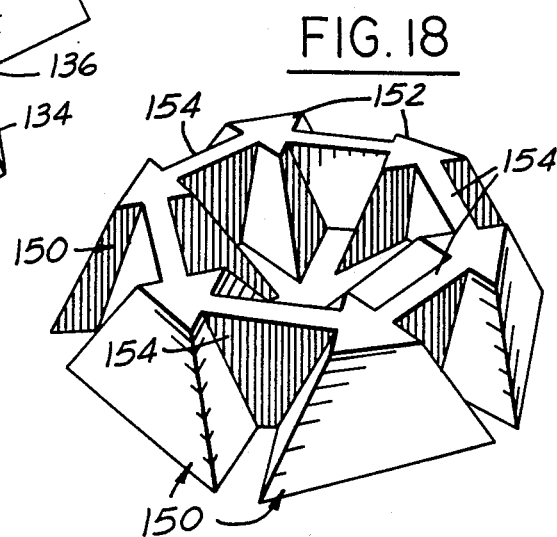
FIG. 18, a modified core design utilizing three-side truncated pyramids circumferentially joined.
Figure 19:
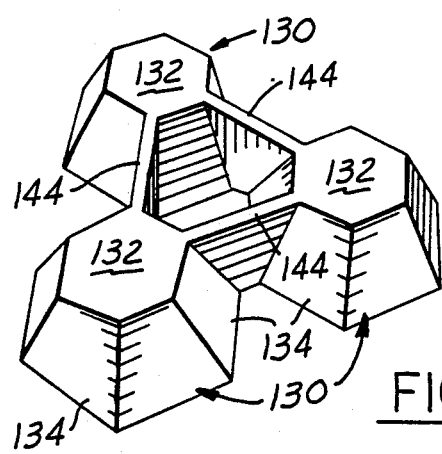
FIG. 19, a modified core design similar to FIG. 17 with circumferential struts.

FIGS. 17, 18 and 19 show also modified geometrical shapes with varying connecting webs. In FIG. 17, hollow, hexagonally based pyramids 130 with tops 132 and sides 134 are arranged in a circumferential cluster with the contiguous bottom edges integrally joined at 136. Radial webs 140 connect the shapes 130 from the middle of the inner sides 134 and are merged at the center 142. These webs can be solid or hollow depending on strength requirements. In FIG. 19, similar shapes 130 are connected circumferentially by webs 144 originating at adjacent corners of the basic hexagonal shapes.

In FIG. 18 an array of hollow, triangular truncated shapes 150 with flat tops 152 are arranged circumferentially in spaced relation and the facing flat sides are connected by webs 154.

All of the geometric shapes illustrated in FIGS. 8 to 19 utilize the basic triangular design in square, triangular or hexagonal truncated pyramids, this is, polygonal shapes, which adapt to various cluster arrangements for horizontal multiplication and to stacking multiplication between confining skins which rigidify the structures to provide high impact strength and which also can be contoured to serve in the automotive field, for example, as panels to substitute for reinforced metal structures now being used. Thus providing a much lighter and less expensive panel.

It will be appreciated that the clusters of FIGS. 8 to 19 as well as the honeycomb embodiments could be molded integrally with the encompassing skin so that the flat tops of the truncated pyramids would be formed by the outer skin itself.

As previously indicated, the cell structure can vary in size and shape, but in each case it is desirable that the cell be hollow unless filled with a light, sound deadening material. In most cases it is preferable that the cells be molded directly to an outer skin to facilitate assembly, and the density of the cells in the plane of a particular structure can vary as well as the thickness of the walls of the cells to adapt to the strength requirements of a particular structure such as a vehicle door panel or a hood panel.

What is claimed is:

1. A structural module for incorporation into a multiple part assembly comprising:
   (a) a series of integrally joined molded, plastic, hollow cells formed as hollow truncated enclosures with closed flat tops and open ends opposite said closed tops, the ends of said shells being disposed in planes of predetermined shapes, the lateral cross-sections of said cells varying from the top to the open ends,
   (b) said cells being arranged in a cluster around a common enter with web connections between sides of said cells, and
   (c) a base skin having an area and contour configuration adapted to a specific use secured to said ends of said hollow cells.

2. A structural module as defined in claim 1 in which said clusters are stacked in opposed facing relation with open ends of said cells integrally joined and said flat tops underlying and joined to spaced planar skins on each side of said stacked clusters, thus forming closed truncated pyramidal and hexagonal cells.

3. A structural module as defined in claim 1 in which said clusters are stacked in pairs with the flat ends of each cluster joined together, the inner open ends of each pair joined together centrally of the structure and outside open ends of each cluster joined to spaced skins on each side of said stacked pairs, thus forming closed truncated pyramidal cells, closed diamond shaped cells, and closed polygonal shaped cells between the spaced skins.

* * * * *

UNITED STATES PATENT AND TRADEMARK OFFICE
CERTIFICATE OF CORRECTION

PATENT NO. : 4,906,508

DATED : March 6, 1990

INVENTOR(S) : Karl Blankenburg and Karl V. Blankenburg

It is certified that error appears in the above-identified patent and that said Letters Patent is hereby corrected as shown below:

Col. 4, Line 62, change "enter" to "center".

Col. 5, Line 3, after "each" delete the comma (,).

Signed and Sealed this

Twenty-eighth Day of May, 1991

*Attest:*

HARRY F. MANBECK, JR.

*Attesting Officer*   *Commissioner of Patents and Trademarks*